March 1, 1949. H. W. DIETERT 2,463,159
INSTRUMENT FOR TESTING DENSITY OF MATERIALS
Filed April 7, 1947 2 Sheets-Sheet 1
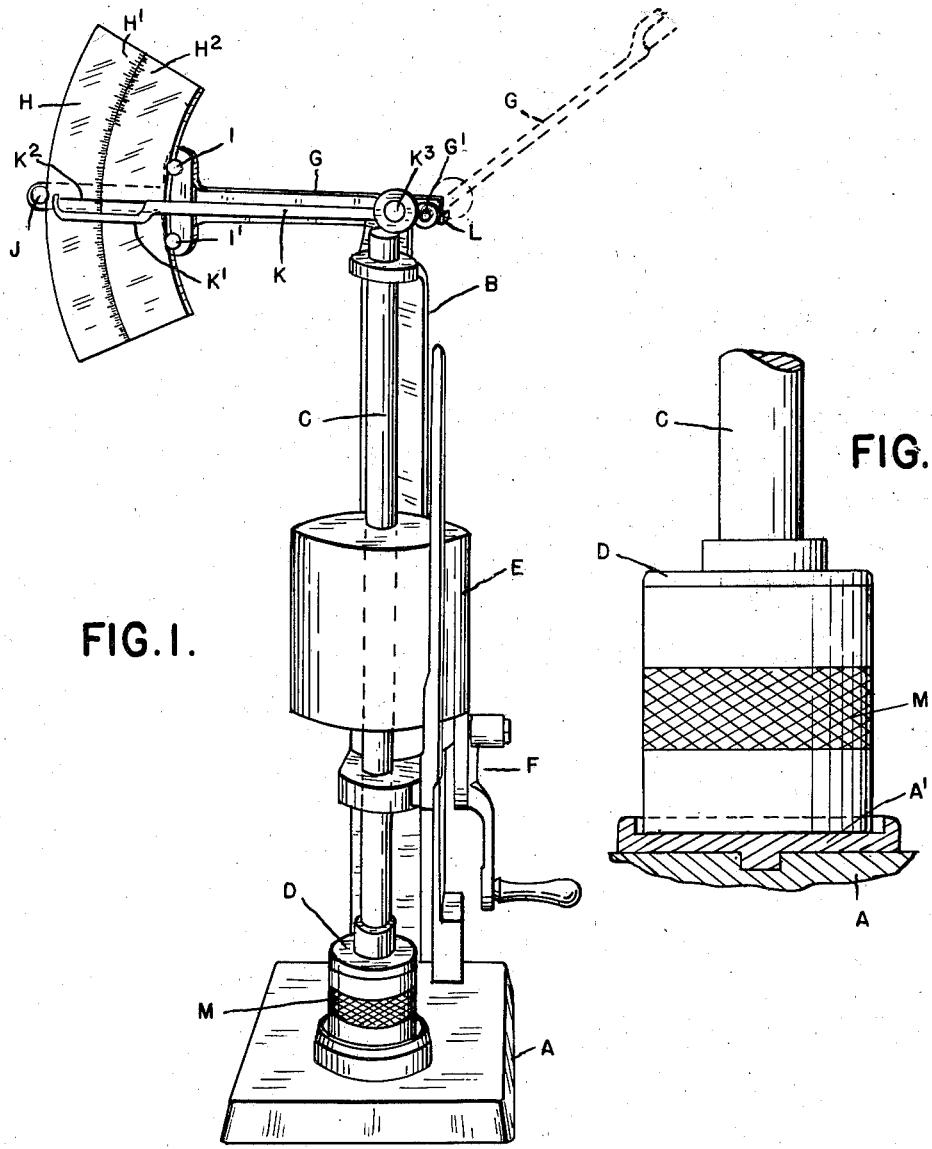
INVENTOR.
HARRY W. DIETERT
BY
ATTORNEYS March 1, 1949.  H. W. DIETERT  2,463,159
INSTRUMENT FOR TESTING DENSITY OF MATERIALS
Filed April 7, 1947  2 Sheets-Sheet 2
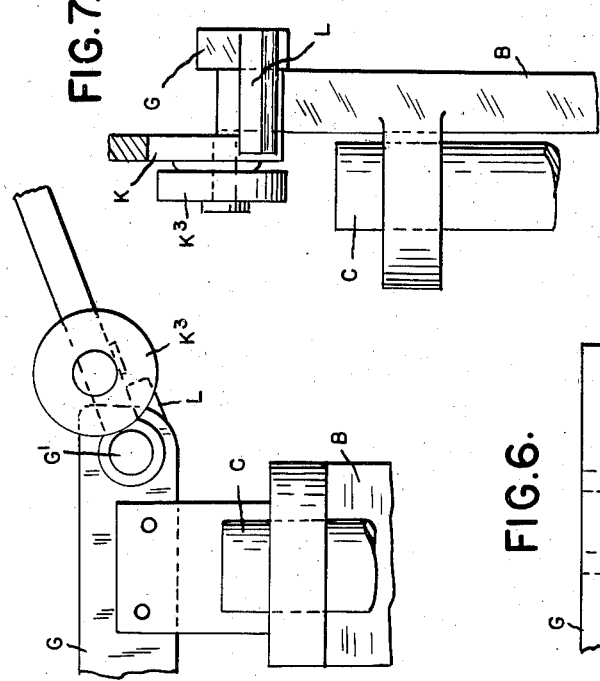
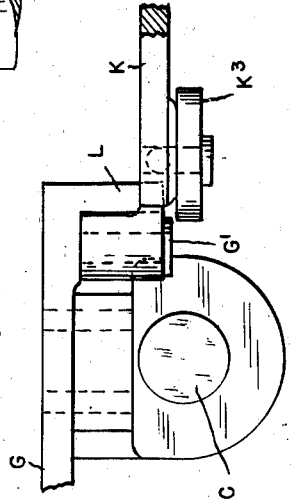
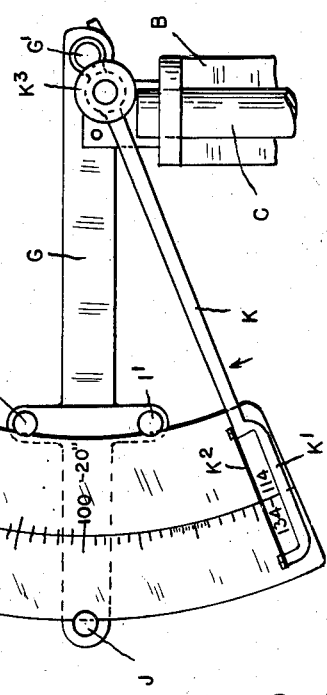
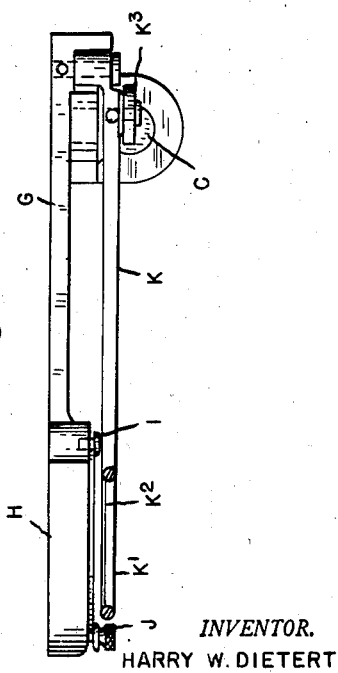
INVENTOR.
HARRY W. DIETERT
BY
*Whittemore, Hulbert & Belknap*
ATTORNEYS Patented Mar. 1, 1949

2,463,159

UNITED STATES PATENT OFFICE 2,463,159

INSTRUMENT FOR TESTING DENSITY OF MATERIALS

Harry W. Dietert, Detroit, Mich.

Application April 7, 1947, Serial No. 739,921

9 Claims. (Cl. 73—32)

1

The invention relates to the testing of compacted sand and similar materials to determine the density thereof. It is a further object to obtain a construction of measuring instrument for carrying out this method and the invention therefore consists in the method and the construction as hereinafter set forth.

In the drawings:

Fig. 1 is a perspective view of my improved density indicator as applied to a sand rammer;

Fig. 2 is a front elevation partly in section of a portion of a rammer showing the means for setting the indicator to get a proper reading;

Fig. 3 is a front elevation of the indicator;

Fig. 4 is a plan view thereof;

Fig. 5 is an elevation similar to Fig. 3 showing the indicator in a position which does not interfere with the operation of the rammer;

Fig. 6 is a plan view of Fig. 5; and

Fig. 7 is an end elevation thereof.

The density of a substance such, for instance, as rammed molding sand may be expressed by the equation:

$$\text{Density (lbs./cu. ft.)} = \frac{\text{weight (in lbs.)}}{\text{volume (in cu. ft.)}}$$

As a specific instance the density of a sand specimen 2" in diameter and weighing 165 grams is expressed by the equation:

$$\text{Density} = \frac{165 \times \frac{1}{454}}{\frac{\pi \text{ length}}{1728}} = \frac{.36}{\text{length} \times \frac{\pi}{1728}} = \frac{200}{\text{length}}$$

$$\text{Density} = \frac{200}{\text{length (in inches)}}$$

When the specimen weight is 194 grams, this becomes:

$$\text{Density} = \frac{235.5}{\text{length (in inches)}}$$

With the weight of the sand and the diameter of the specimen constant, density is proportional to the length. In the use of my apparatus I place a predetermined weight of the material in a specimen holder of predetermined constant internal cross sectional area, ram the material in said holder and accurately measure the height of the rammed specimen by a scale calibrated in units of density.

The instrument for carrying out this method includes a supporting base for the specimen holder, a column rising from said base, a rigid arm projecting laterally from said column and carrying a scale at its outer end and a pointer arm pivoted to said rigid arm to cooperate with said scale and having a bearing near the pivot

2 fulcrum for resting directly or indirectly upon the upper end of the rammed specimen. Preferably this density testing instrument is formed as an attachment to a specimen rammer so as to utilize certain elements of this structure. I will therefore specifically describe such an instrument, but it is to be understood it is not essential in the carrying out of my method to use this combination.

As illustrated, the sand rammer employed is similar to that forming the subject matter of Patent No. 2,400,851 to R. E. Steinmueller, "Sand rammer," May 21, 1946. Such an instrument is illustrated in Fig. 1 and comprises generally a base A with a column B rising therefrom. A plunger rod C vertically slidably engages bearings on the column B and has a rammer head D at its lower end. A weight E is sleeved on the rod C and normally rests on a crosshead thereon while a crank actuated cam F is employed for raising the weight and then dropping it to deliver an impact to the rod C and rammer head D. The construction is such that the sand specimen placed within a holder tube is compacted therein by the head D under the impact of one or more blows of the weight E.

Without further description of the rammer, the application of the density indicator thereto is as follows. Secured to the upper end of the column B is a laterally extending arm G which is arranged in rear of the rod C so as not to interfere with the operation of the latter. Near the outer end of the arm G is secured a segmental indicator plate H, the inner edge of which bears against a pair of spaced headed pins I and I' secured to the arm G, respectively above and below the center thereof. The outer edge of the plate H is adjacent to a headed clamping pin J having a threaded engagement with the outer end of the arm G. Thus by loosening the clamping pin J the segmental plate H may be adjusted upward or downward but always remains concentric to a fixed point G' in the arm G located to the right of the rod C as viewed in Fig. 3. Pivotally secured to the arm G at point G' is a pointer K having at its outer end a U-shaped portion K' with an indicator wire $K^2$ extending thereacross. This is adapted to cooperate with one or more scales on the plate H as will be later described. The pointer arm K has mounted thereon a disk roller $K^3$, which when the arm is in the position shown in Figs. 3 and 4 bears against the upper end of the rod C. However, by swinging the arm K into the position shown in Figs. 5 and 6 both arm and roller will be removed from the path of the rod C so as to not interfere with the operation of the rammer. In the latter position of the indicator arm it is supported by resting upon a finger L projecting from the end portion of the arm G.

With the construction as above described it is evident that with the indicator arm in the position shown in Figs. 5 and 6, the rammer may be used without interference to ram a specimen of sand in a holder tube. In performing this operation a definite quantity of sand by weight is first placed in the tube, the latter being then placed in a flanged holder A' on the base A to align it with the rod C and rammer head D. The compacting of the sand is accomplished as previously described by the raising and dropping of the weight E one or more times. Before performing this operation the indicator plate H is adjusted to give a proper density reading for the particular sand specimen. Such adjustment is accomplished by first placing in the holder A' a height measurement block M corresponding with the height of a properly rammed specimen of sand and in then resting the rammer head D on the top of this block. The pointer arm K is then turned to extend to the left, as shown in Figs. 1 and 3, the roller disk K³ resting upon the upper end of the rod C. The clamping pin J is then loosened and the plate H adjusted to bring an index marking thereon corresponding to the weight of sand specimen into registration with the wire K². For instance, if the block is two inches in height and the weight of the sand 165 grams the index numeral 2 on the plate will register with the wire K². After the ramming of the specimen has been accomplished the arm K is turned into the position shown in Figs. 1 and 3 with the roller K³ resting upon the rod C. The position of the indicator wire K² on the scale will then indicate the density of the specimen, which should be 100 lbs. per cubic foot, since this marking on the scale is in line with the index marking 2. The indication may however be greater or less if the specimen is not properly rammed.

As above stated with the weight of the sand and the diameter of the specimen constant, density is proportional to the length. Thus the indicator shows the length of the green sand specimen as rammed and the scale is calibrated to read directly in pounds per cubic feet. Preferably two or more scales H'H² are placed on the plate H corresponding to different weights of sand specimens, as for instance 165 grams, 194 grams. Thus after making a density test with a 165 gram specimen if the density exceeds 112 lbs./cu. ft. it is advisable to use a sample weighing 194 grams and proceed in the same manner.

What I claim as my invention is:

1. A density measuring instrument comprising a base for supporting a rammed specimen of predetermined cross sectional area, an indicator arm pivotally mounted above said base and having a bearing portion near the pivot for resting on the upper end of said specimen, and a scale mounted in cooperative relation to the free end of said pointer arm and calibrated in units of density.

2. A density measuring instrument comprising a base for supporting a rammed specimen of predetermined cross sectional area, a column rising from said base, a rigid arm projecting laterally from said column, a pointer arm pivotally mounted on said rigid arm and having a bearing portion adjacent to its pivot for resting on the upper end of said specimen, and a scale at the outer end of said rigid arm in cooperative relation to said pointer arm, said scale being calibrated in units of density.

3. The combination with a sand specimen rammer including a base, a column rising therefrom, a rammer head above said base, and a rod secured to said head to extend upward therefrom and slideably mounted on said column; of a density indicator unit mounted on said column and normally positioned to avoid interference with the operation of said rammer, said unit comprising an arm rigidly attached to the upper end portion of said column, a pointer arm pivotally attached to said rigid arm and provided with a bearing for resting upon the upper end of said rod, and a scale secured to the outer end of said rigid arm in operative relation to said pointer, said scale being calibrated in density units.

4. The combination with a sand specimen rammer including a base, a column rising therefrom, a rammer head above said base, and a rod secured to said head to extend upward therefrom and slideably mounted on said column; of a density indicator unit mounted on said column and normally positioned to avoid interference with the operation of said rammer, said unit comprising an arm rigidly attached to the upper end portion of said column, a pointer arm pivotally attached to said rigid arm and provided with a bearing for resting upon the upper end of said rod, a scale mounted on said rigid arm in cooperative relation to said pointer, and means for adjusting said scale to set the same in relation to said pointer when said rammer head is positioned a predetermined distance above said base.

5. The combination with a sand specimen rammer including a base, a column rising therefrom, a rammer head above said base, and a rod secured to said head to extend upward therefrom and slideably mounted on said column; of a density indicator unit mounted on said column and normally positioned to avoid interference with the operation of said rammer, said unit comprising an arm rigidly attached to the upper end portion of said column, a pointer arm pivotally attached to said rigid arm and provided with a bearing for resting upon the upper end of said rod, and a scale mounted on said rigid arm to be adjustable about the axis of the pointer whereby said scale can be set with respect to said pointer when said rammer head is positioned a predetermined distance above said base.

6. A density indicator unit adapted for mounting on a sand specimen ramming unit, said indicator unit comprising an arm for rigid attachment to the frame of said sand rammer, a pointer pivotally mounted on said arm adjacent to its mounting on said frame, a bearing on said pointer for resting on a movable part of said rammer, a scale for cooperating with said pointer having parallel segmental edges, spaced bearings on said rigid arm for engaging one of said segmental edges, a clamping bearing on said rigid arm for engaging the opposite segmental edge, said segmental edges being concentric with the axis of said pointer pivot whereby said scale can be set on said rigid arm to correspond to the setting of said rammer.

7. A density measuring attachment for a sand specimen rammer having a base for supporting a sand specimen to be rammed, a column rising from said base, and a vertically slidable plunger rod carried by said column and provided at its lower end with a head for ramming said sand specimen; comprising an arm secured to and projecting laterally from said column at one side of said rod, a pointer pivotally connected to said arm, an indicator wire carried by said pointer, a bearing for said pointer engageable with said rod; a segmental plate on said arm concentric with the pivot for said pointer and provided with a scale adapted to cooperate with said indicator wire to indicate the density of a rammed sand specimen when such specimen is engaged by said rammer head, said plate being adjustable when said rammer head is positioned a predetermined distance above said base to initially set said scale in relation to said indicator wire.

8. A density measuring attachment for a sand specimen rammer having a base for supporting a sand specimen to be rammed, a column rising from said base, and a vertically slidable plunger rod carried by said column and provided at its lower end with a head for ramming said sand specimen; comprising an arm secured to and projecting laterally from said column at one side of said rod, a pointer pivotally connected to said arm, an indicator wire carried by said pointer, a bearing for said pointer engageable with said rod, and an adjustable plate on said arm provided with a scale adapted to cooperate with said indicator wire to indicate the density of a rammed sand specimen when such specimen is engaged by said rammer head.

9. A density measuring attachment for a sand specimen rammer having a base for supporting a sand specimen to be rammed, a column rising from said base, and a vertically slidable plunger rod carried by said column and provided at its lower end with a head for ramming said sand specimen; comprising an arm secured to and projecting laterally from said column at one side of said rod, a pointer pivotally connected to said arm, an indicator wire carried by said pointer, a bearing for said pointer engageable with said rod, an adjustable plate on said arm provided with a scale adapted to cooperate with said indicator wire to indicate the density of a rammed sand specimen when such specimen is engaged by said rammer head, and means carried by said laterally projecting arm for supporting said pointer when said bearing is out of engagement with said rod.

HARRY W. DIETERT.

REFERENCES CITED

The following references are of record in the file of this patent:

UNITED STATES PATENTS

| Number | Name | Date |
| --- | --- | --- |
| 2,400,851 | Steinmueller | May 21, 1946 |

FOREIGN PATENTS

| Number | Country | Date |
| --- | --- | --- |
| 552,930 | Great Britain | Apr. 30, 1943 |